United States Patent [19]

Lowe, Jr.

[11] Patent Number: 4,537,148
[45] Date of Patent: Aug. 27, 1985

[54] PACKAGE OF LITTER MATERIAL FOR CATS AND OTHER SMALL ANIMALS

[76] Inventor: Henry E. Lowe, Jr., 201 N. Edwards St., Cassopolis, Mich. 49031

[21] Appl. No.: 625,529

[22] Filed: Jun. 28, 1984

Related U.S. Application Data

[63] Continuation-in-part of Ser. No. 439,034, Nov. 4, 1982, which is a continuation-in-part of Ser. No. 132,285, Mar. 20, 1980, Pat. No. 4,448,151.

[51] Int. Cl.³ .............................................. A01K 1/015
[52] U.S. Cl. ......................................................... 119/1
[58] Field of Search ............................................. 119/1

[56] References Cited

U.S. PATENT DOCUMENTS

| | | | |
|---|---|---|---|
| 3,154,052 | 10/1964 | Sweeney | 119/1 |
| 3,332,397 | 7/1967 | Vander Wall | 119/1 |
| 3,735,734 | 5/1973 | Pierce et al. | 119/1 |
| 3,745,975 | 7/1973 | Purcha | 119/1 |
| 3,886,901 | 6/1975 | Zeitter | 119/1 |
| 3,983,842 | 10/1976 | Marion et al. | 119/1 |
| 4,129,094 | 12/1978 | Stockel | 119/1 |
| 4,296,709 | 10/1981 | Schulein, Jr. | 119/1 |
| 4,386,579 | 6/1983 | Harsh et al. | 119/1 |

FOREIGN PATENT DOCUMENTS

| | | | |
|---|---|---|---|
| WO82/03151 | 11/1982 | PCT Int'l Appl. | 119/1 |
| 1023162 | 3/1966 | United Kingdom | 119/1 |
| 1533261 | 11/1978 | United Kingdom | 119/1 |

*Primary Examiner*—Hugh R. Chammblee
*Attorney, Agent, or Firm*—Marmaduke A. Hobbs

[57] ABSTRACT

A package of litter for small animals, having two horizontally disposed layers of particulate, liquid absorbent material, the lower layer of which is of relatively light particulate material of organic composition, containing an odor suppressant therein, and the upper layer of which is of relatively heavy particulate material of inorganic composition. The upper layer may have odor suppressant in an amount substantially less than in the lower layer, though normally the upper layer does not contain any substantial amount of odor suppressant material. The litter is normally packaged in a plurality of elongated bag-like containers, joined together at the sides by a frangible web and at the top by a removable header. When the litter is to be used, the top of the container is opened to permit the discharge of the litter from the container into a box when the container is inverted, to form a litter bed of relatively heavy material on the bottom and the relatively coarse or light material containing the odor suppressant on top.

15 Claims, 6 Drawing Figures

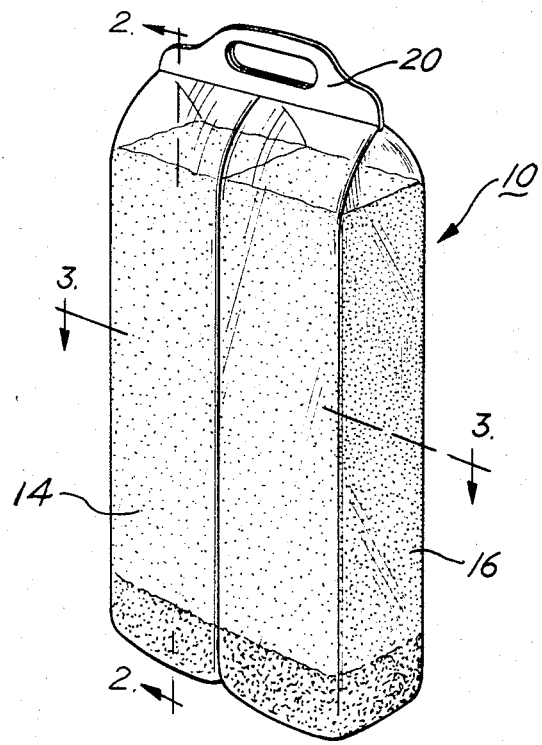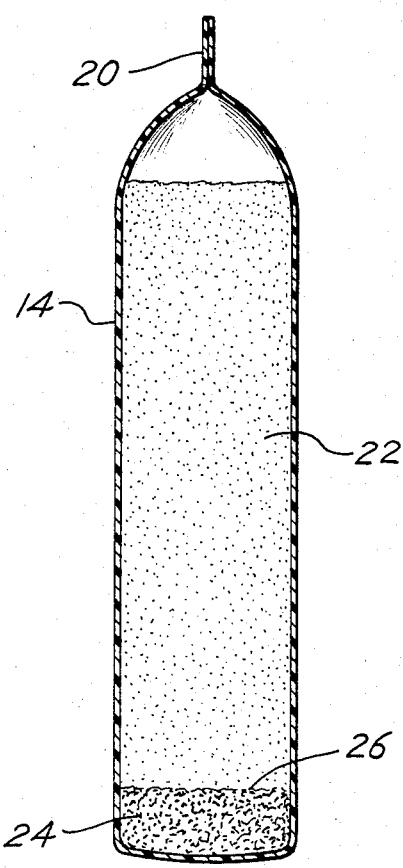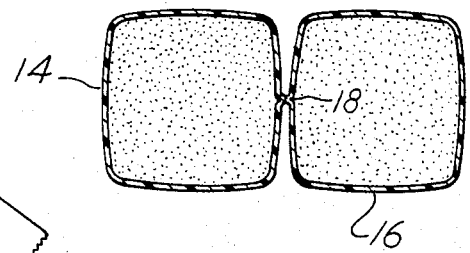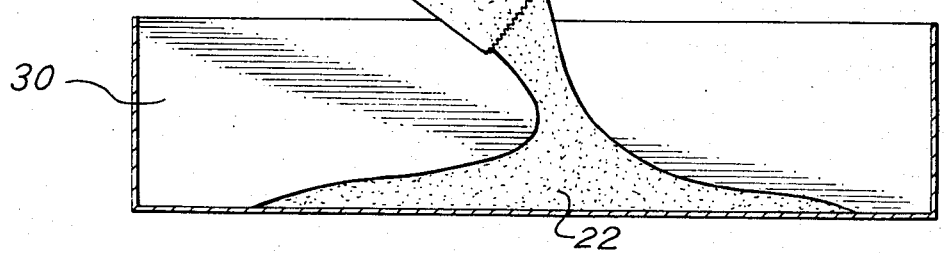

PACKAGE OF LITTER MATERIAL FOR CATS AND OTHER SMALL ANIMALS

This application is a continuation-in-part of pending application Ser. No. 439,034, filed Nov. 4, 1982, which was a continuation-in-part of application Ser. No. 132,285, filed Mar. 20, 1980, now U.S. Pat No. 4,448,151.

BACKGROUND OF THE INVENTION

One of the most difficult problems encountered in providing and maintaining litter boxes for cats to use indoors is the suppression of the odor from the cat's waste. Various preparations are sold in small containers which can be used by adding them from time to time to the litter material in the box as the litter material is used by the cat. The practice is not only inconvenient, but is also often messy and unpleasant, and it is difficult to obtain distribution of the odor suppressant where it will be most effectively utilized. If the odor suppressant is carefully mixed with the litter to obtain good distribution, the separate suppressant can be effective; however, usually some portions of the litter receive an excessive amount of the suppressant, resulting in a waste of the relatively expensive preparation, and other portions receive amounts too small to be effective. Hence, the use of a separate odor suppressant for addition to the litter material in the foregoing manner has not been generally accepted by cat owners. Another practice which has been successful in obtaining the desired suppression of the odor in the litter has been the mixing of the suppressant fully with litter at the time the litter is prepared and packaged for distribution and sale. After using the litter in the box, the cat customarily covers the waste by scraping the litter over the waste, using its paw to move the litter in the close proximity of the waste. Since the cat usually uses the litter only close to the center of the box near the top of the litter, only a small portion of the litter is used by the cat, the litter in the bottom and/or along the periphery of the box often remaining relatively clean and free of odor-causing waste. Since effective odor suppressants are generally rather expensive, the mixing of the suppressant with the litter before packaging unnecessarily increases the cost of the final material, in that a substantial amount of the litter material is never in contact with the cat's waste, and hence performs no appreciable function in suppressing the odor at any time during the use of the litter material.

SUMMRY OF THE INVENTION

An object of the invention is to provide a package of cat box filler material which consists of a layer in one end of the container having an odor suppressant mixed therewith and a layer in the other end of the container having little or no odor suppressant therein, and which is elongated in shape and has a discharge opening in the end adjacent the material with little or no odor suppressant.

Another object of the invention is to provide a package of the aforesaid type which is relatively simple to fill, ship, and use, and which assists in spreading the material when emptied, to obtain the most advantageous use of the portion with the odor suppressant.

A further object of the invention is to provide a package for and method of creating multiple layers of material in a sanitary cat box, in which one of the layers has a relatively large amount of odor suppressant, and another layer has relatively little or no odor suppressant, and in which the first layer is most concentrated at the place in the box which is used most often by the cat.

The present invention relates to a package of small animal litter material which has a first layer in the package of relatively light and/or coarse particulate material treated with an odor suppressant, and a second layer in the package of a relatively heavy and/or fine particulate material either not treated with odor suppressant or treated with a lesser amount of odor suppressant than the first layer, so that when the material has been emptied from the end of the package having the heavier or finer material into the cat box, the layer having the greatest amount of odor suppressant treated material will be on top and in the place where the cat most often uses the material in the box. Further, the first layer may be given any suitable, desired color which may enhance the appearance of the litter in the cat box and/or mask the waste left uncovered by the cat. The first layer is preferably a particulate, organic material, such as, for example, ground corncobs or peanut hulls, and the second layer is preferably a particulate, absorbent clay material.

BRIEF DESCRIPTION OF THE DRAWINGS

FIG. 1 is a perspective view of a package of litter material, embodying the present invention;

FIG. 2 is a vertical cross-sectional view of the package shown in FIG. 1, the section being taken on line 2—2 of the latter figure;

FIG. 3 is a horizontal cross-sectional view of the package shown in the preceding figures, the section being taken on line 3—3 of FIG. 1;

FIG. 4 is an elevational view of a bag and a cross-sectional view of a sanitary cat box, showing the material in the bag being transferred to the box;

DESCRIPTION OF THE PREFERRED EMBODIMENT

Figure 5:
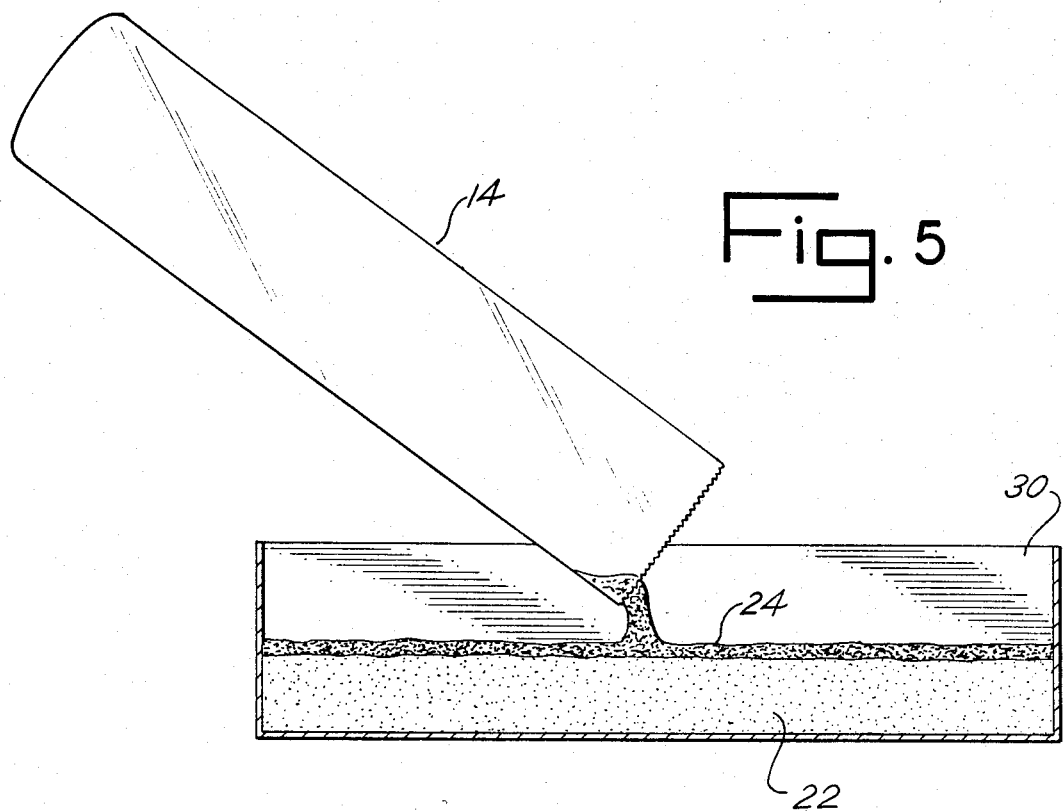
FIG. 5 is a view similar to that seen in FIG. 4, but representing a later stage in the box-filling operation.

Referring more specifically to the drawings, and to FIGS. 1, 2 and 3 in particular, numeral 10 indicates generally a package of cat box filler material, sometimes referred to as cat litter, consisting of a pair of bags 14 and 16 joined to each other by a web 18, and upper handle portion 20. The two bags are essentially identical in construction, and the material therein is in the same condition in both bags. Normally, the two ends of each bag are sealed, and the upper ends of the bags should be relatively easy to open for the purpose of discharging the litter material therefrom into a sanitary cat box, such as illustrated in FIG. 4. In transferring the material from the bag to the box, a bag is opened at the top and normally separated from the other bag at a tear seam in web 18 to permit easy handling of a single bag in transferring the material to the box. The package may be constructed of either paper, plastic, or a combination of these materials. Preferably, the bags are of transparent flexible plastic and are of a five or ten pound size, normally marketed through supermarkets or hardware or pet stores.

The litter material in each of the two bags 14 and 16 has two distinct layers, namely an upper layer 22 of relatively heavy and/or fine particulate, inorganic material, and a lower layer 24 of a relatively light and/or coarse particulate, organic material, with a rather distinct dividing line 26 where the two materials are in contact with each other. The lower layer 24, of relatively light and normally coarse particulate material, contains, or is treated with, an odor suppressant, and the upper layer 22 is normally without any odor suppressant, or with only a relatively small amount of odor suppressant. The basic material of the upper layer 22 is preferably ground clay, and the lower layer 24 is an organic material, such as ground corncobs or peanut shells containing an odor suppressant material. Other kinds of particulate, organic material can be used to form layer 24, and some of the material so used may inherently have a natural odor suppressant material therein. The organic material of layer 24 may be of natural color; however, normally it would be colored, for example, with green dye, so that the two layers can readily be distinguished from one another to emphasize the two distinct layers in the transparent bag and to provide a pleasing appearance to the litter material when it has been transferred to the box. It is important that the organic material of layer 24 be substantially lighter in weight than the inorganic material of layer 22, so that when the litter material has been poured in the box, the light organic material will remain on top of the bed of litter material, since the odor suppressant material is primarily in the organic material deposited on top of the inorganic material, thereby creating an effective odor suppressant relationship between the layers.

The kind or type of odor suppressant may vary depending upon suitability of the material for minimizing odor from the urine and feces deposited by the cat or other animal in the sanitary box. While the two layers may both contain an odor suppressant, the odor suppressant in layer 24 is normally substantially more potent than the odor suppressant in layer 22, and, if an odor suppressant is present in both layers, the type of odor suppressant may be different in the two layers. Layer 24 forms the top layer of the filler material after the material has been transferred to the box and, hence, acts to prevent odor from the animal waste from permeating the air above the box.

The two layers 22 and 24 are not normally physically separated from one another, but merely form a line of contact, as indicated by numeral 26, as seen in all the figures in the drawings. The size of the particles of the respective layers 22 and 24 is not particularly critical, so long as layer 24 is of a coarser and/or lighter texture than layer 22, and is of a size suitable for use by cats or other animals. Since cats habitually cover the deposited feces, the material should be of a size which can be easily moved by the cat's paw to perform the covering operation. Thus, a wide range of particle sizes in the two layers is possible, so long as the relationship in the foregoing particle size and/or weight is maintained, i.e. a relatively light, particulate material in layer 24 and a relatively heavy particulate material in layer 22. The particle size of layer 24 is normally larger than a mesh size of 8, usually between 6 and 8, and the size for layer 22 is normally smaller than a mesh size 8, usually between 8 and 60. The heavy material of layer 22 may constitute as much as 95% by weight of the litter material, although the amounts of material in the two layers may vary relative to one another over a rather wide range.

Figure 6:
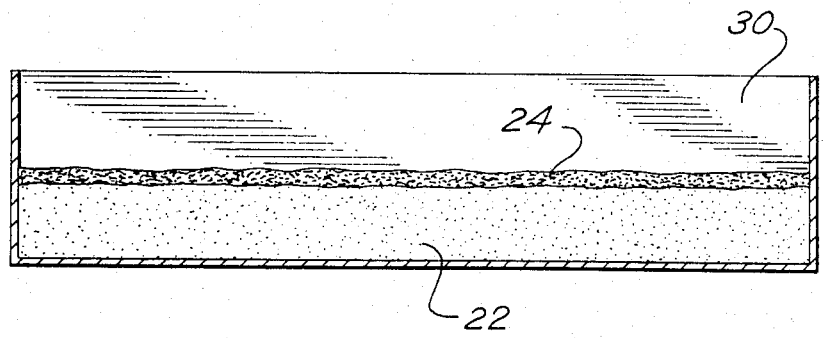
FIG. 6 is a cross-sectional view of the box shown in FIGS. 4 and 5, with the material of the bag fully emptied into the box in condition for use by a cat.

The multiple-layer litter material is preferably sold in transparent, flexible plastic bags which can conveniently be opened at the top so that the material can easily be discharged from the bag to box 30 where the two layers of the bag form two layers, as illustrated in FIGS. 4, 5 and 6. The individual bags 14 and 16 are preferably rather long and narrow, so that the two layers will tend to remain separated throughout the transfer operation from the bag to the box. The manner in which the material is removed from the bag, and the flow of the material therefrom, are illustrated in FIGS. 4, 5 and 6. After the top of the bag has been opened, the bag is inverted and the material poured into an area near the center of the box. As this takes place, the heavy material forms the bottom layer 22 and the lighter organic material forms the top layer 24. The handle portion 20 of the top of the bag is preferably provided with a perforated seam or tear strip portion, so that when the handle is torn from a particular bag, the bag is thereby opened, permitting the material to be discharged in the manner previously described, preferably with the particular bag in hand being separated from the adjacent bag. A special advantage in the use of the relatively heavy and/or fine material for layer 22, and the relatively light and/or coarse material for layer 24, is that the two layers tend to remain separated even after extensive use of the material by the cat or other animal. After the material has been transferred from the bag to the box, as illustrated in FIGS. 4, 5 and 6, not only does the odor suppressant material in the relatively light and/or coarse material tend to remain on top of the relatively heavy and/or fine material, but the relatively light and/or coarse particulate material can be maintained as an effective upper layer by jarring or otherwise vibrating the litter material in the box from time to time between uses of the box by the cat or other animal.

The steps by which the material in the dual package, shown in FIG. 1, is transferred to the box consist of separating handle 20 from a particular bag, such as bag 14, and thereby opening the top of the bag. Normally, the opened bag 14 will be separated from bag 16 by the use of the tear strip or seam in web 18 so that bag 14 can be handled as an individual bag in the pouring operation. After the bag has been opened and separated, as previously explained, it is inverted, and the heavy or fine material flows from the bag to form the bottom layer in the box, and the lighter organic material flows on top of the heavier material and forms a distinct top layer over the heavier material. This operation permits the relatively fine material to cover the entire lower portion of the box, particularly if the package is moved in a horizontal fashion during the pouring operation. After both layers have been transferred to the box, the material can be smoothed by hand or otherwise to form a completely horizontal surface for the animal, and, in the event there has been any mixing of the relatively heavy and/or fine and relatively light and/or coarse materials, the box can be jarred or otherwise vibrated to effect a suitable separation of the two materials, with the relatively light and/or coarse material containing the potent odor suppressant materials remaining on top. The special advantages of the present invention are that any inherent mingling of the material resulting from unavoidable vibration in transportation or handling can effectively be overcome, and the relatively expensive odor suppressant material can always be maintained as the upper layer of the box, regardless of any undue scratching action performed by the cat or other animal. The box can be jarred or otherwise vibrated to separate the two materials from one another into their respective layers, with the heavy and/or fine material being on the bottom and the relatively light and/or coarse material being on the top, as previously described herein.

While only one embodiment of the present cat box filler material has been described in detail herein, various changes and modifications may be made without departing from the scope of the invention.

I claim:

1. A package of litter material for small animals, comprising a container having elongated side walls and opposite end walls, a first layer of relatively light particulate material of organic composition disposed in one end of said elongated container and having an odor suppressant therein, and a second layer of relatively heavy particulate material of inorganic composition disposed in the other end of said elongated container, the end wall adjacent said relatively heavy material being openable for discharging sequentially first said relatively heavy particulate layer and then said relatively light particulate layer to form a multiple layer bed of litter with said relatively light particulate material forming the top layer of said bed.

2. A package of litter material for small animals as defined in claim 1 in which said layer of relatively heavy particulate material contains an odor suppressant material in an amount substantially less than the amount of odor suppressant material in said light particulate material.

3. A package of litter material for small animals as defined in claim 1 in which said relatively heavy particulate material is substantially free of odor suppressant material.

4. A package of litter material for small animals as defined in claim 1 in which said relatively heavy particulate material consists of ground clay and said light particulate material consists of an organic substance of a class including peanut hulls and corncobs.

5. A package of litter material for small animals as defined in claim 1 in which the particles of the relatively light particulate material are in the range of 6 to 8 mesh size and the particles of the relatively heavy material are in the range of 8 to 60 mesh size.

6. A package of litter material for small animals as defined in claim 1 in which said layer of relatively light particulate material is disposed in the bottom end of the package when the package is in a normal upright position, and the end wall opposite the end in which the light particulate material is disposed is openable for discharging the layers of particulate material.

7. A package of litter material for small animals as defined in claim 2 in which said layer of relatively light particulate material contains an odor suppressant material in an amount substantially greater than the amount of odor suppressant material in said heavy particulate material.

8. A package of litter material for small animals as defined in claim 6 in which said relatively heavy particulate material consists of ground clay and said light particulate material consists of an organic substance of a class including peanut hulls and corncobs.

9. A package of litter material for small animals as defined in claim 8 in which the particles of the relatively light particulate material are in the range of 6 to 8 mesh size and the particles of the relatively heavy material are in the range of 8 to 60 mesh size.

10. A container of litter material for small animals, comprising a plurality of elongated bag sections joined together in side-by-side arrangement, each bag section having side walls and opposite end walls and containing a first layer of relatively light particulate material of organic composition disposed in one end of said elongated container and having an odor suppressant therein, and a second layer of relatively heavy particulate material of inorganic composition disposed in the other end of said elongated container, the end wall adjacent said relatively heavy material being openable for discharging sequentially first said relatively heavy particulate layer and then said relatively light particulate layer to form a multiple layer bed of litter with said relatively light particulate material forming the top layer of said bed.

11. A container of litter material for small animals as defined in claim 10 in which said relatively heavy particulate material consists of ground clay and said light particulate material consists of an organic substance of a class including peanut hulls and corncobs.

12. A container of litter material for small animals as defined in claim 10 in which said bag sections are joined together by a frangible web throughout substantially the full length of the bags.

13. A container of litter material for small animals as defined in claim 10 in which, in each bag section, said layer of relatively light particulate material is disposed in the bottom end of the section when the container is in normal upright position, and the upper end wall opposite the end in which the light particulate material is disposed is openable for discharging the layers of particulate material.

14. A container of litter material for small animals as defined in claim 13 in which said layer of relatively light particulate material contains an odor suppressant material in an amount substantially greater than the amount of odor suppressant material in said heavy particulate material.

15. A container of litter material for small animals as defined in claim 13 in which said bag sections are joined together by a frangible web throughout substantially the full length of the bags, and a header is joined to said bag sections at the end in which said relatively heavy material is disposed.

* * * * *